(12) United States Patent
Boxwell et al.

(10) Patent No.: US 11,210,590 B2
(45) Date of Patent: Dec. 28, 2021

(54) GENERATING FREE TEXT REPRESENTING SEMANTIC RELATIONSHIPS BETWEEN LINKED ENTITIES IN A KNOWLEDGE GRAPH

(71) Applicant: INTERNATIONAL BUSINESS MACHINES CORPORATION, Armonk, NY (US)

(72) Inventors: Stephen Arthur Boxwell, Columbus, OH (US); Kyle Matthew Brake, Dublin, OH (US); Stanley John Vernier, Grove City, OH (US); Keith Gregory Frost, Delaware, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/242,401

(22) Filed: Jan. 8, 2019

(65) Prior Publication Data

US 2020/0218988 A1 Jul. 9, 2020

(51) Int. Cl.
*G06F 17/00* (2019.01)
*G06N 5/02* (2006.01)
(Continued)

(52) U.S. Cl.
CPC .......... *G06N 5/02* (2013.01); *G06F 16/3329* (2019.01); *G06F 40/30* (2020.01); *G06K 9/6297* (2013.01)

(58) Field of Classification Search
CPC ...... G06F 16/3344; G06F 40/30; G06F 16/35; G06F 16/3329; G06F 16/9024;
(Continued)

(56) References Cited

U.S. PATENT DOCUMENTS

| 7,231,341 | B2 | 6/2007 | Bangalore | |
| 8,296,257 | B1 * | 10/2012 | Chavira | G06F 16/358 |
| | | | | 706/62 |

(Continued)

OTHER PUBLICATIONS

W.-t. Yih, M.-W. Chang, X. He, and J. Gao. Semantic parsing via staged query graph generation: Question answering with knowledge base. In Proceedings of the Joint Conference of the 53rd Annual Meeting of the ACL and the 7th International Joint Conference on Natural Language Processing of the AFNLP, (Year: 2015).*

*Primary Examiner* — Michael Ortiz-Sanchez
(74) *Attorney, Agent, or Firm* — Cantor Colburn LLP; David Mattheis

(57) ABSTRACT

A computer-implemented method includes generating from a corpus a knowledge graph comprising a plurality of nodes interconnected by a plurality of edges. Each node of the plurality of nodes represents an entity extracted from the corpus. Each edge of the plurality of edges represents a relationship between corresponding entities extracted from the corpus. The knowledge graph includes a plurality of source passages extracted from the corpus from which the plurality of edges was generated. A generative language model is trained, for each edge of the plurality of edges, to associate two or more related entities by utilizing the knowledge graph. Using the trained generative language model, one or more passages representing the edge of the knowledge graph are generated for each edge of the knowledge graph.

20 Claims, 3 Drawing Sheets

(51) Int. Cl.
   *G06F 16/332* (2019.01)
   *G06K 9/62* (2006.01)
   *G06F 40/30* (2020.01)

(58) Field of Classification Search
   CPC ...... G06F 40/20; G06F 40/284; G06F 40/295;
      G10L 15/22; G10L 15/063; G10L 15/197;
      G10L 15/26; G10L 13/08; G06N 5/02;
      G06K 9/6297
   See application file for complete search history.

(56) References Cited

U.S. PATENT DOCUMENTS

| | | | |
|---|---|---|---|
| 9,529,894 B2 | 12/2016 | Nolan | |
| 9,836,671 B2 * | 12/2017 | Gao | G06F 40/30 |
| 9,858,263 B1 * | 1/2018 | Xiao | G06F 40/289 |
| 9,940,367 B1 | 4/2018 | Baker | |
| 9,996,525 B2 | 6/2018 | Ackermann | |
| 10,606,846 B2 * | 3/2020 | Li | G06N 3/0445 |
| 10,810,193 B1 * | 10/2020 | Subramanya | G06F 16/9024 |
| 10,929,606 B2 * | 2/2021 | Martineau | G06F 40/169 |
| 2009/0287678 A1 * | 11/2009 | Brown | G06F 16/334 |
| 2012/0330647 A1 * | 12/2012 | Burges | G06F 40/44 704/9 |
| 2015/0331846 A1 | 11/2015 | Guggilla | |
| 2015/0332670 A1 * | 11/2015 | Akbacak | G06F 40/40 704/9 |
| 2015/0332672 A1 * | 11/2015 | Akbacak | G06F 16/637 704/257 |
| 2015/0339835 A1 * | 11/2015 | Mohr | G06T 11/206 345/440 |
| 2016/0117030 A1 | 4/2016 | Mungi | |
| 2016/0378851 A1 | 12/2016 | Merdivan | |
| 2017/0329868 A1 * | 11/2017 | Lindsley | G06N 20/00 |
| 2018/0075359 A1 | 3/2018 | Brennan | |
| 2018/0089382 A1 | 3/2018 | Allen | |
| 2018/0367549 A1 * | 12/2018 | Jang | G06F 16/9024 |
| 2019/0065576 A1 * | 2/2019 | Peng | G06F 16/3329 |
| 2019/0129934 A1 * | 5/2019 | Kadav | G06F 3/0644 |
| 2020/0004752 A1 * | 1/2020 | Majumdar | G06N 3/006 |
| 2020/0004832 A1 * | 1/2020 | Juric | G06F 16/243 |

* cited by examiner

GENERATING FREE TEXT REPRESENTING SEMANTIC RELATIONSHIPS BETWEEN LINKED ENTITIES IN A KNOWLEDGE GRAPH

BACKGROUND

The present invention relates to machine learning and, more specifically, to automatic generation of free text representing semantic relationships between linked entities in a knowledge graph.

An increasing number of cognitive systems are being developed and used in enterprises and other environments. Generally, a cognitive system may include a question answering component which may be an artificial intelligence application executing on data processing hardware that answers questions pertaining to a given subject-matter domain presented in natural language. For such question answering component it is often advantageous to consult structured data that has been extracted from unstructured data. For example, a large unstructured corpus might be scanned for common semantic relations between entities. Such semantic relations may include, for instance, "isCapitalOf", "isSpouseOf", "isPresidentOf", and the like. A question answering component of a cognitive system typically receives an implicit query, such as "Show me everything you know about Alexander Hamilton". In response to receiving such a query, the question answering component may generate a knowledge graph which may be useful for visualization of available data. However, it can be difficult sometimes to effectively represent data stored in a knowledge graph in a natural language question-answering context. What is needed is a method of automatically generating text representing linked entities in a knowledge graph for natural language communication use in a cognitive system.

SUMMARY

Embodiments of the present invention are directed to a computer-implemented method for generating exemplary representations of linked entities in an automatically generated knowledge graph. A non-limiting example of the computer-implemented method includes generating from a corpus a knowledge graph comprising a plurality of nodes interconnected by a plurality of edges. Each node of the plurality of nodes represents an entity extracted from the corpus. Each edge of the plurality of edges represents a relationship between corresponding entities extracted from the corpus. The knowledge graph includes a plurality of source passages extracted from the corpus from which the plurality of edges was generated. A generative language model is trained, for each edge of the plurality of edges, to associate two or more related entities by utilizing the knowledge graph. Using the trained language, one or more passages representing the edge of the knowledge graph are generated for each edge of the graph.

Embodiments of the present invention are directed to a system for generating exemplary representations of linked entities in an automatically generated knowledge graph. A non-limiting example of the system includes a memory having computer-readable instructions and one or more processors for executing the computer-readable instructions. The computer-readable instructions include generating from a corpus a knowledge graph comprising a plurality of nodes interconnected by a plurality of edges. Each node of the plurality of nodes represents an entity extracted from the corpus. Each edge of the plurality of edges represents a relationship between corresponding entities extracted from the corpus. The knowledge graph includes a plurality of source passages extracted from the corpus from which the plurality of edges was generated. A generative language model is trained, for each edge of the plurality of edges, to associate two or more related entities by utilizing the knowledge graph. Using the trained language, one or more passages representing the edge of the knowledge graph are generated for each edge of the graph.

Embodiments of the invention are directed to a computer-program product for generating exemplary representations of linked entities in an automatically generated knowledge graph, the computer-program product including a computer-readable storage medium having program instructions embodied therewith. The program instructions are executable by a processor to cause the processor to perform a method. A non-limiting example of the method includes generating from a corpus a knowledge graph comprising a plurality of nodes interconnected by a plurality of edges. Each node of the plurality of nodes represents an entity extracted from the corpus. Each edge of the plurality of edges represents a relationship between corresponding entities extracted from the corpus. The knowledge graph includes a plurality of source passages extracted from the corpus from which the plurality of edges was generated. A generative language model is trained, for each edge of the plurality of edges, to associate two or more related entities by utilizing the knowledge graph. Using the trained language, one or more passages representing the edge of the knowledge graph are generated for each edge of the graph.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
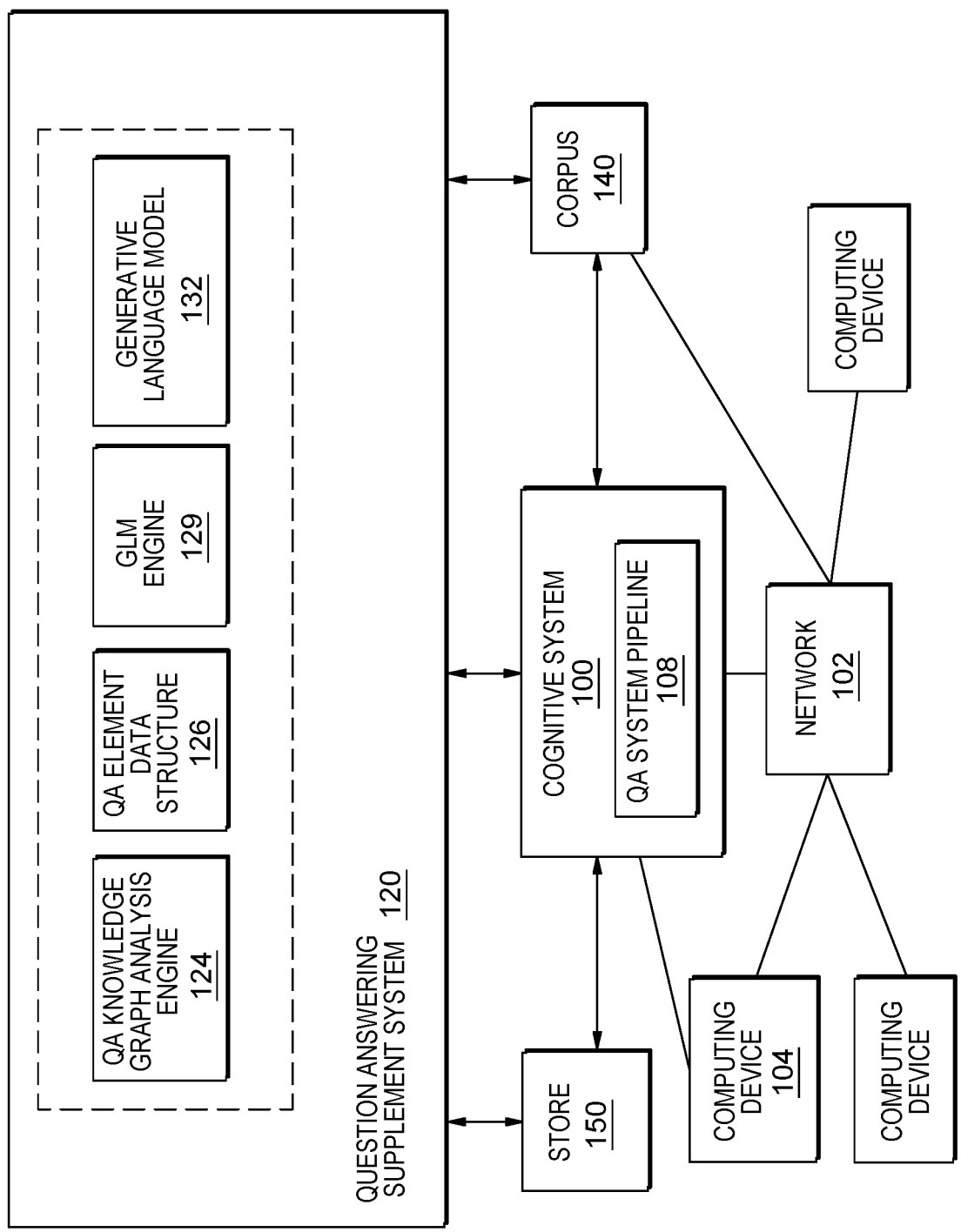
FIG. 1 depicts a schematic diagram of one illustrative embodiment of a cognitive system implementing a question answering (QA) supplement system in a computer network.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the methods, and systems described below may advantageously be employed by various artificial intelligence systems that are tasked to answer questions. In such systems, it is generally advantageous to utilize structured data derived from unstructured data. In some embodiments of the present invention, such structured data may be stored in a form of a knowledge graph. A knowledge graph is a structure used to model pairwise relations between objects or syntactic entities in a passage. A knowledge graph in this context can refer to a collection of entities or nodes and a collection of relations or edges that connect pairs of nodes. In an embodiment, a knowledge graph is represented graphically by drawing a dot for every entity and drawing an arc or line between two terms if they are connected by an edge or relation. If the graph is directed, the direction can be indicated by drawing an arrow. In some instances, the knowledge graph can be stored within a database that includes data representing a plurality of syntactic entities and relations between the syntactic entities. The database structure can be conceptually/visually represented as a graph of nodes with interconnections. Accordingly, the term knowledge graph can be used to denote entities and their relations. However, it can sometimes be difficult to effectively represent data stored in a knowledge graph in a natural language question-answering context.

Turning now to an overview of the aspects of the invention, one or more embodiments of the invention address the above-described shortcomings of the prior art by providing a mechanism to utilize a domain specific knowledge graph automatically generated from a corpus. According to an embodiment of the present invention, each edge of the knowledge graph stores a list of source passages from which the edge was generated. These source passages are used to train a natural language generation model linking the two nodes in a graph interconnected by an edge. The natural language generation model uses a search algorithm that provides a simple, clean, and efficient interface between the speech and natural language components of a spoken language. In one embodiment, the natural language generation model uses the N-best algorithm, which is a time-synchronous Viterbi-style algorithm that is substantially guaranteed to generate the N most likely text passage alternatives that are within a given beam of the most likely passage representing a particular edge of the knowledge graph. The generated passages may be used in a Natural Language Processing (NLP) component of a cognitive system or another artificial intelligence system for answer scoring, passage scoring, question correction or for many other similar purposes.

The above-described aspects of the invention address the shortcomings of the prior art by providing efficient and substantially accurate method of automatic generation of natural language text representing semantic relations between linked entities in a knowledge graph. In the past, there has not been an efficient way of using information stored in a knowledge graph that can be utilized in a question answering context. Advantageously, embodiments of the invention enable a cognitive system to utilize a free text generation scheme that can reduce the noise inherent in the source passages from which the content associated with the knowledge graph was extracted.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems can perform the following functions:
- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence In one aspect, cognitive systems provide mechanisms for answering questions posed to these cognitive systems using a QA pipeline or QA system. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users can input questions in a natural language to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during the evaluation of the candidate answers, as a single final answer having a highest-ranking score or confidence measure, or which is a best match to the input question, or a combination of ranked listing and final answer.

FIG. 1 depicts a schematic diagram of one illustrative embodiment of a cognitive system 100 implementing a question and answer (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables QA generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receives inputs from various sources. For example, the cognitive system 100 receives input from the network 102, corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of unstructured data with the cognitive system 100. The document includes any file, text, article, or source of data for use in the cognitive system 100. QA supplement system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108 and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation web site, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for integrating a QA supplement system 120.

One or more questions received from a user can be subjected to natural language processing techniques of the cognitive system 100 and/or QA supplement system 120 to transform the source passages into knowledge graphs where nodes represent syntactic entities, and edges/connectors represent the overall connections between the syntactic entities. This operation may be performed, for example, as part of an ingestion operation of the cognitive system 100 which reads the natural language text of the electronic documents or asked questions, parses the natural language text and performs natural language processing on the natural language text, including performing annotation operations using annotators, to extract key features and facts of the natural language text which are then converted to the knowledge graphs. The reading, parsing, extracting and graph generating can occur independent of the language of the electronic documents or asked questions.

The generated knowledge graphs containing a plurality of source passages are stored in storage device 150 associated with either the cognitive system 100 or QA supplement system 120, where the storage device 150 may be a memory, a hard disk based storage device, flash memory, solid state storage device, or the like (hereafter assumed to be a "memory" with in-memory representations of the knowledge graphs for purposes of description).

Either as part of an ingestion operation, or by the QA knowledge graph analysis engine 124 analyzing the knowledge graphs generated by the ingestion operation, a QA element data structure 126 defining the various relationships between syntactic entities extracted from the ingested unstructured source passages of corpus 140, as well as other QA elements pre-populated in the QA element data structure 126 either through analysis of other corpora or through manual input by subject matter expert interaction, is generated. According to an embodiment of the present invention, the QA knowledge graph analysis engine 124 may generate a plurality of edges between a plurality of nodes representing syntactic entities.

According to an embodiment of the present invention, during a training of the QA supplement system 120, each edge of the knowledge graph stored in the QA element data structure 126 is analyzed by a Generative Language Model (GLM) engine 129 to identify relationships between the linked entities and to train a corresponding generative language model 132 to generate one or more natural language passages representing the relationships between the syntactic entities corresponding to a particular edge of the analyzed knowledge graph. Advantageously, as noted above, generative language model 132 may employ an n-best generation scheme described below.

The generated one or more natural language passages are provided to cognitive system 100 for use in providing an answer to a question. This selection may be based on the ranking of the generated passages by comparison to the presented input query. For example, a top ranked automatically generated passage may be selected for use in presenting an answer to the utterance. Alternatively, the generated passages may be utilized by cognitive system 100 for other purposes as well, such as correcting entities in queries by generating alternative question candidates.

Figure 2:
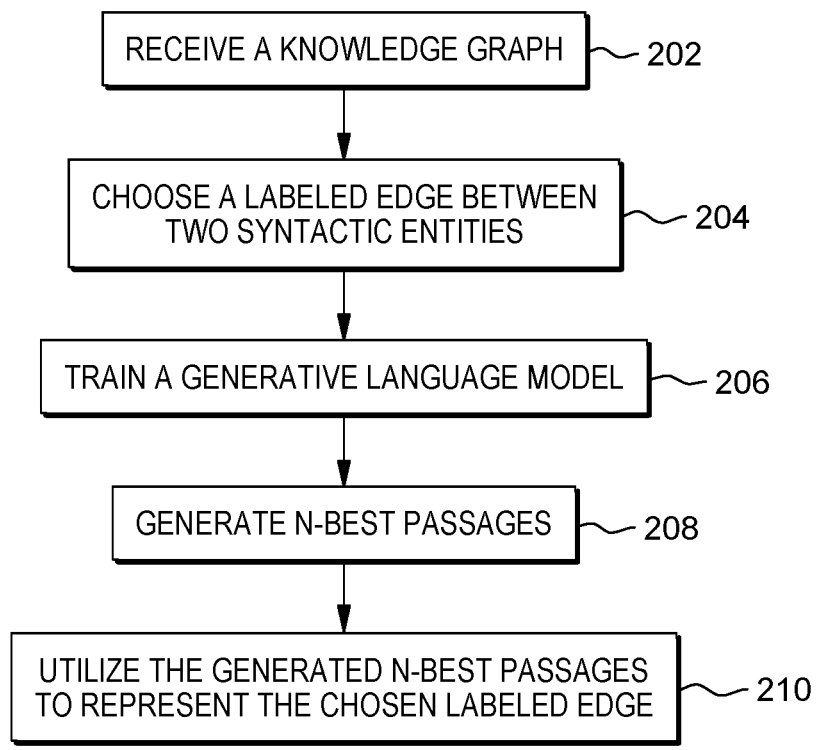
FIG. 2 is a flow diagram of a method for generating exemplary representations of linked entities in an automatically generated knowledge graph, according to some embodiments of the invention.

FIG. 2 is a flow diagram of a method for generating exemplary representations of linked entities in an automatically generated knowledge graph, according to some embodiments of the invention. In one embodiment, at block 202, QA knowledge graph analysis engine 124 receives a knowledge graph.

In one embodiment, a corpus of unstructured data 140 is being processed in association with a knowledge graph. The knowledge graph is derived from one or more data sources containing a plurality of source passages and includes a set of nodes, and a set of edges. During training phase, unstructured data is extracted from corpus 140, and a knowledge graph is built. The knowledge graph typically comprises a set of nodes, and a set of edges, with an edge representing a relationship between a pair of nodes in the set. According to the disclosed method, the knowledge graph and potentially passage sources from which the knowledge graph is derived are then examined to further refine the relationships between the linked nodes/entities in a question-answering context. At least in some embodiments, the knowledge graph may associate and store, for each edge of the generated graph, a plurality of source passages from which the edge was generated.

In an embodiment of the present invention, the knowledge graph is generated from corpus 140 using an automated method. The mechanisms of the illustrative embodiments may utilize an entity identification and tracking engine, such as the Statistical Information and Relation Extraction (SIRE) engine available from International Business Machines Corporation of Armonk, N.Y. SIRE provides components for term or entity detection using maximum entropy models that can be trained from annotated data, a trainable co-reference component for grouping detected terms in a document that correspond to the same entity, and a trainable relation extraction system. Of course, other entity identification and tracking engines may be used for generating a knowledge graph without departing from the spirit and scope of the illustrative embodiments and SIRE is used herein only as an example to facilitate understanding of the improvements made by the illustrative embodiments.

Typically, the knowledge about relationships between syntactic entities that was derived during automatic method of knowledge graph generation might be difficult to manipulate in the aggregate to attempt to answer questions presented to the cognitive system 100 primarily due to the lack of sufficient information on the focus of the input question. To overcome this problem, the QA supplement system 120 may perform steps described below to represent information associated with each edge of the generated knowledge graph. The knowledge graph may have different types of edges representing different relationships, and two nodes may be connected by more than one edge.

According to an embodiment of the present invention, GLM engine 129 analyzes each edge of the generated KG. More specifically, at block 204, GLM 129 chooses a labeled edge between two nodes (syntactic entities), retrieves source passages associated with the chosen edge and trains a pair of generative language models 132 using the retrieved source passages (block 206). In some embodiments, this training step may involve replacing actual syntactic entities with meta-tokens, such as for example, meta-tokens representing FROM and TO entities in the context of a knowledge graph. Functionality of the GLM engine 129 can be beneficially described through examples presented below. For instance, the knowledge graph automatically created by extracting data from unstructured text corpus 140 may have an edge representing a relationship between entities Barack Obama and John Kerry and annotated as "appointedBy" label. In reality, this edge may be generated by QA knowledge graph analysis engine 124 in response to evaluating potentially dozens of source passages. However, assume, for purposes of illustration, that QA knowledge graph analysis engine 124 derived the "appointedBy" relationship from the following three passages extracted from corpus 140: 1) "Barack Obama appointed John Kerry to be his Secretary of State after the departure of Hillary Clinton"; 2) "Barack Obama, who appointed John Kerry as his Secretary of State, was reportedly happy with the Iran Nuclear Deal"; 3) "It was widely assumed that Barack Obama would appoint John Kerry."

It should be noted, at least in some situations, stored source passages associated with the corresponding relationship may not always be adequate for question answering purposes. For example, consider another instance of relationships of syntactic entities represented by "appointedBy" label. In this case the link between George W. Bush and Ann Veneman entities may be derived from the following source passage: "Ann Veneman, cabinet member, senior executive and presidential appointee of George W. Bush, signed the order." This source passage is not ideal for answering some straightforward input queries (such as, "Who appointed Ann Veneman?") primarily because the appointer-appointee relationship is not the focal point of the passage. In addition, syntax of the source passage is somewhat complex and artificial intelligence components performing context-dependent semantic analysis are likely to be confused by the interfering information that is included in the source passage but is not relevant to the syntactic relationship of interest here ("appointedBy").

As noted above, to address this problem, at block 206, the GLM engine 129 generates a passage corresponding to a relationship associated with the labeled edge selected at block 204 using a generative language model 132 trained on all source passages associated with the labeled edge. In speech recognition and natural language processing, Hidden Markov Models (HMMs) have been used extensively to model the acoustics of speech or the observations of text. HMMs are generative models that use the concept of a hidden state sequence to model the non-stationarity of the generation of observations from a label. At each frame of an input signal (or word), the HMM determines the probability of generating that frame from each possible hidden state. This probability is determined by applying a feature vector derived from the frame of speech (or text) to a set of probability distributions associated with the state. In addition, the HMM determines a probability of transitioning from a previous state to each of the states in the Hidden Markov Model. Using the combined transition probability and observation probability, the Hidden Markov Model selects a state that is most likely to have generated a frame.

One of the state-of-the-art HMM structures for speech recognition is set forth in the article "Maximum-Likelihood Estimation for Mixture Multivariate Stochastic Observations of Markov Chains," by B. J. Juang, AT&T Technical Journal, 64(1985), pp. 1235-1240. The HMMs in this model use mixtures of multivariate Gaussian components to model each of the state distributions internal to the HMM structure. Typically, there are about S=10 states in each HMM and approximately G=12 Gaussian components per state. During the training phase, there are M×S×G=40×10×12=4800 covariance matrices that must be estimated (i.e. trained) and stored for later use in the speech recognition phase. The number of variates in the multivariate Gaussian components is typically on the order of L=10. Since a general covariance matrix of size L requires a minimum of L(L+1)/2+10×(10+1)/2=55 floating point numbers, the total storage required by this approach is on the order of 55×4800=264,000 storage locations or one megabyte in a 32-bit computer. The required storage will vary as indicated with the size and number of HMMs and with the precision of the host computer's floating-point number representation.

According to an embodiment of the present invention, the generative language model 132 can be a surface-level first-order Markov model, HMM, partially observable Markov decision processes, and the like. In yet another embodiment, generative language model 132 may be any other generative model capable of generating the sentences, subject to sets of constraints that are derived from the source passages. This natural language generation scheme may be effected using the well-known inside-outside algorithm described by Baker, 79, ("Trainable grammars for speech recognition," Proceedings of the Spring Conference of the Acoustical Society of America, pages 547-550").

At block 208, generative language model 132 is configured to receive a relationship between syntactic entities represented by an edge of a knowledge graph and to generate one or more n-best passages (sequences of words) that correspond to the given relationship. For example, generative language model 132 trained by the source passages listed above and associated with the "appointedBy" relationship may generate a simple natural language passage— "Barack Obama appointed John Kerry", among other n-best passages. In various embodiments, the n-best generated passages could be different from any source passages utilized to train the generative language model 132. In other words, generative language model 132 learns to identify most common words associated with the linked syntactic entities and appearing in the source passages and determines the simplest way to express the relationship between the linked entities using natural language. At least some of the automatically generated passages may be grammatically incorrect.

In an embodiment, generative language model 132 may utilize Viterbi algorithm called "n-best". The Viterbi algorithm determines at each step of the analysis of a passage the n most probable sequences of words. At the end of analysis, the most probable solution is chosen among the n candidates, using the scores provided by the generative language model 132. Advantageously, the generated passages are unlikely to include unusual phrases or specific sentence constructs that can be found in the plurality of source passages, since such phrases and sentence constructs would be specific to a particular source passage.

Referring back to FIG. 2, at block 210, cognitive system 100 may utilize the generated one or more N-best passages to represent the labeled edge chosen at block 204. For example, the generated N-best passages may be utilized to assign scores to a plurality of candidate answers in response to a factoid-style or definition-style input question. A factoid question is typically a question about a fact that can be "looked up". A definition question is a question that contains a definition of the answer and where the words defined by the question are expected as an answer. In another embodiment, cognitive system 100 may utilize the passages generated at block 210 to answer yes/no input questions simply by comparing the generated passages with the input question presented to the cognitive system 100. Furthermore, cognitive system 100 may utilize results of step 210 to correct some entities in factually incorrect questions by generating alternative question candidates. For example, if cognitive system 100 identifies factually incorrect question, such as, "In what year did Lee Harvey Oswald shoot Abraham Lincoln?", in response, cognitive system 100 may generate an alternative question candidate, such as, "In what year did John Wilkes Booth shoot Abraham Lincoln?" based on the passages generated at block 208. In yet another embodiment, the generated N-best passages may be utilized by cognitive system 100 to simply generate text and/or generate audio narration (e.g., using text to speech conversion) of succinct short-passage answers to users of cognitive system 100.

Figure 3:
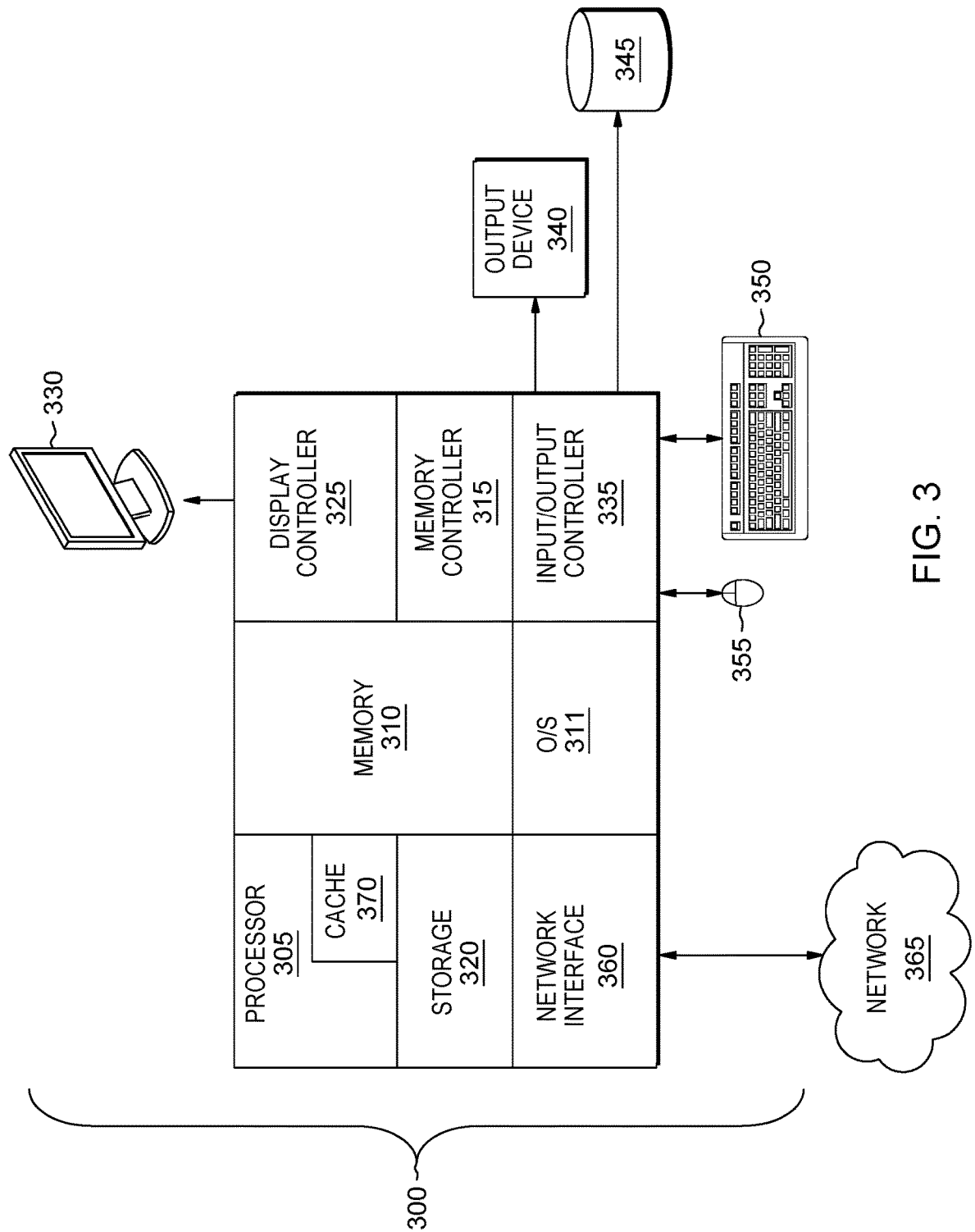
FIG. 3 is a block diagram of a computer system for implementing some or all aspects of the sourcing system, according to some embodiments of this invention.

FIG. 3 is a block diagram of a computer system 300 for implementing some or all aspects of the cognitive system 100, according to some embodiments of this invention. The cognitive systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For instance, the question answering supplement system 120, the GLM engine 129, and the generative language model 132 may each be implemented as a computer system 300 or may run on a computer system 300.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the cognitive systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Cognitive systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for generating exemplary representations of linked entities in an automatically generated knowledge graph, the method comprising:
   automatically generating from a corpus a knowledge graph comprising a plurality of nodes interconnected by a plurality of edges, wherein each node of the plurality of nodes represents an entity extracted from the corpus, each edge of the plurality of edges represents a relationship between corresponding entities extracted from the corpus and is associated with a plurality of source passages extracted from the corpus from which each edge was generated;
   storing a list of source passages from the corpus previously used to automatically generate a selected edge of the plurality of edges for two or more related nodes of the knowledge graph, the selected edge having been generated from the list of the source passages, the list of the source passages being from the corpus on which the knowledge graph is based and representing at least one relationship between the two or more related nodes of the knowledge graph;

performing a training process for a generative language model, the training process comprising:

retrieving the list of the source passages having been stored from the corpus previously used to automatically generate the selected edge for the two or more related nodes of the knowledge graph; and training a generative language model, using the list of the source passages from the corpus previously used to automatically generate the selected edge, to represent a predetermined relationship associated with the selected edge for the two or more related nodes of the knowledge graph;

generating, using the trained generative language model, one or more passages different from the list of the source passages having been stored from the corpus previously used to automatically generate the selected edge, the one or more passages representing the predetermined relationship of the selected edge specific to the list of the source passages of the knowledge graph; and using the one or more passages to represent the selected edge.

2. The method of claim 1, wherein the one or more passages generated by the trained generative language model comprise natural language passages.

3. The method of claim 1, wherein the one or more passages are generated according to an n-best generation scheme.

4. The method of claim 1, wherein the corpus includes a plurality of unstructured text documents.

5. The method of claim 1, wherein the generative language model comprises at least one of a first order Markov model, a hidden Markov model, partially observable Markov decision processes, or a syntactic inside-outside model.

6. The method of claim 1, further comprising providing the one or more passages to a system configured to answer questions.

7. The method of claim 1, further comprising generating an audio narration of the one or more passages.

8. A system comprising:

a memory having computer-readable instructions; and one or more processors for executing the computer-readable instructions, the computer-readable instructions comprising:

automatically generating from a corpus a knowledge graph comprising a plurality of nodes interconnected by a plurality of edges, wherein each node of the plurality of nodes represents an entity extracted from the corpus, each edge of the plurality of edges represents a relationship between corresponding entities extracted from the corpus and is associated with a plurality of source passages extracted from the corpus from which each edge was generated;

storing a list of source passages from the corpus previously used to automatically generate a selected edge of the plurality of edges for two or more related nodes of the knowledge graph, the selected edge having been generated from the list of the source passages, the list of the source passages being from the corpus on which the knowledge graph is based and representing at least one relationship between the two or more related nodes of the knowledge graph;

performing a training process for a generative language model, the training process comprising:

retrieving the list of the source passages having been stored from the corpus previously used to automatically generate the selected edge for two or more related nodes of the knowledge graph; and training a generative language model, using the list of the source passages from the corpus previously used to automatically generate the selected edge, to represent a predetermined relationship associated with the selected edge for the two or more nodes of the knowledge graph;

generating, using the trained generative language model, one or more passages different from the list of the source passages having been stored from the corpus previously used to automatically generate the selected edge, the one or more passages representing the predetermined relationship of the selected edge specific to the list of the source passages of the knowledge graph; and using the one or more passages to represent the selected edge.

9. The system of claim 8, wherein the one or more passages generated by the trained generative language model comprise natural language passages.

10. The system of claim 8, wherein the one or more passages are generated according to an n-best generation scheme.

11. The system of claim 8, wherein the corpus includes a plurality of unstructured text documents.

12. The system of claim 8, wherein the generative language model comprises at least one of a first order Markov model, a hidden Markov model, partially observable Markov decision processes, or a syntactic inside-outside model.

13. The system of claim 8, the computer-readable instructions further comprising providing the one or more passages to a system configured to answer questions.

14. The system of claim 8, the computer-readable instructions further comprising generating an audio narration of the one or more passages.

15. A computer-program product for generating exemplary representations of linked entities in an automatically generated knowledge graph, the computer-program product comprising a computer-readable storage medium having program instructions embodied therewith, the program instructions executable by a processor to cause the processor to perform a method comprising:

automatically generating from a corpus a knowledge graph comprising a plurality of nodes interconnected by a plurality of edges, wherein each node of the plurality of nodes represents an entity extracted from the corpus, each edge of the plurality of edges represents a relationship between corresponding entities extracted from the corpus and is associated with a plurality of source passages extracted from the corpus from which each edge was generated;

storing a list of source passages from the corpus previously used to automatically generate a selected edge of the plurality of edges for two or more related nodes of the knowledge graph, the selected edge having been generated from the list of the source passages, the list of the source passages being from the corpus on which the knowledge graph is based and representing at least one relationship between the two or more related nodes of the knowledge graph;

performing a training process for a generative language model, the training process comprising:
  retrieving the list of the source passages having been stored from the corpus previously used to automatically generate the selected edge for the two or more related nodes of the knowledge graph; and
  training a generative language model, using the list of the source passages from the corpus previously used to automatically generate the selected, to represent a predetermined relationship associated with the selected edge for the two or more related nodes of the knowledge graph;

generating, using the trained generative language model, one or more passages different from the list of the source passages having been stored from the corpus previously used to automatically generate the selected edge, the one or more passages representing the predetermined relationship of representing the selected edge specific to the list of the source passages of the knowledge graph; and using the one or more passages to represent the selected edge.

16. The computer-program product of claim 15, wherein the one or more passages generated by the trained generative language model comprise natural language passages.

17. The computer-program product of claim 15, wherein the one or more passages are generated according to an n-best generation scheme.

18. The computer-program product of claim 15, wherein the corpus includes a plurality of unstructured text documents.

19. The computer-program product of claim 15, wherein the generative language model comprises at least one of a first order Markov model, a hidden Markov model, partially observable Markov decision processes, or a syntactic inside-outside model.

20. The computer-program product of claim 15, the method further comprising providing the one or more passages to a system configured to answer questions.

* * * * *